United States Patent
Brissette

(10) Patent No.: US 6,379,048 B1
(45) Date of Patent: Apr. 30, 2002

(54) SELF-ALIGNING CENTER BEARING

(75) Inventor: Ronald N. Brissette, Lake Orion, MI (US)

(73) Assignee: Meritor Heavy Vehicle Technology, LLC, Troy, MI (US)

(*) Notice: Subject to any disclaimer, the term of this patent is extended or adjusted under 35 U.S.C. 154(b) by 0 days.

(21) Appl. No.: 09/670,291

(22) Filed: Sep. 25, 2000

(51) Int. Cl.⁷ ................................................ F16C 23/04
(52) U.S. Cl. ....................... 384/202; 384/536; 384/441
(58) Field of Search ............................... 384/202, 441, 384/536, 428, 438, 537

(56) References Cited

U.S. PATENT DOCUMENTS 5,052,825 A * 10/1991 Battig ........................ 384/223
5,829,892 A * 11/1998 Groves ....................... 384/537

* cited by examiner

Primary Examiner—Lenard A. Footland
(74) Attorney, Agent, or Firm—Carlson, Gaskey & Olds

(57) ABSTRACT

An improved bearing support structure for a vehicle driveline includes a bracket having ears for supporting a bearing cushion. The ears are separated by a distance which is greater than the thickness of the cushion such that the cushion can self-align within the bracket. In this way, a variety of driveline angles can be accommodated by the bearing cushion within the bracket. Moreover, the bearing cushion is provided with recesses which facilitate the ability of the cushion to flex to further allow relative alignment of the axis of the driveline within the bracket.

10 Claims, 3 Drawing Sheets

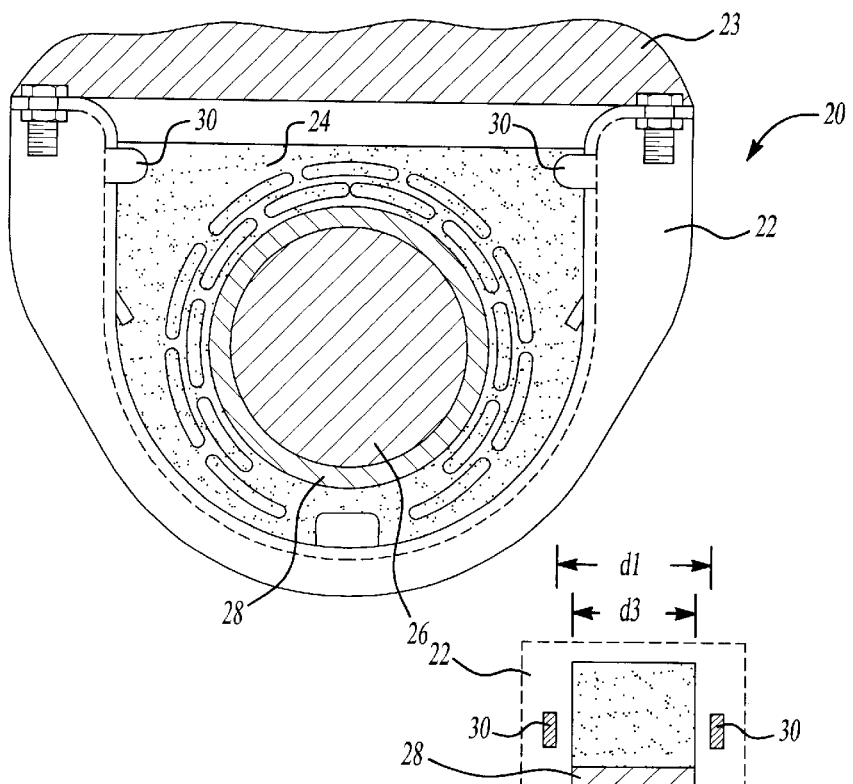
_Fig-1_
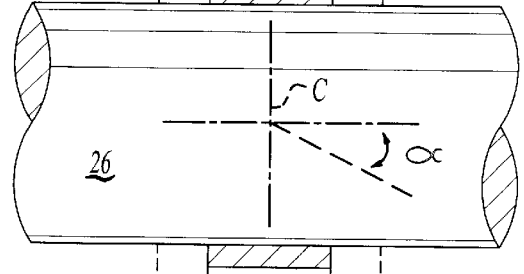
_Fig-2_
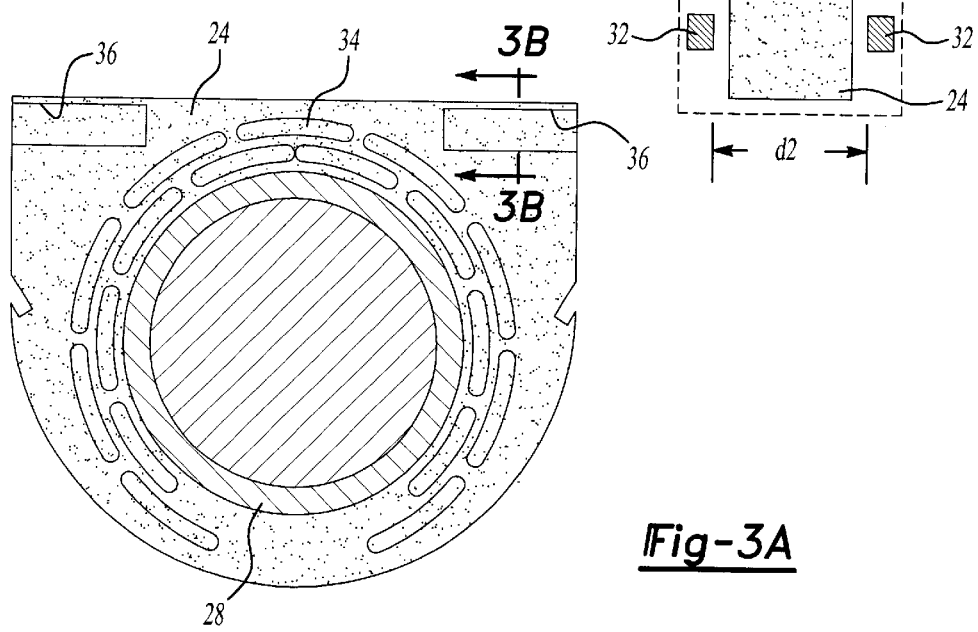
_Fig-3A_

SELF-ALIGNING CENTER BEARING

BACKGROUND OF THE INVENTION

This application relates to a center bearing for a vehicle driveline which allows the driveline to self-align itself within the supporting bearing cushion and associated support bracket.

Vehicle drivelines typically include a driveshaft that extends a relatively long distance along the vehicle. The shaft must be supported at spaced locations. Typically, a bearing supports the shaft and is received within a resilient bearing cushion. The bearing cushion is supported within a support bracket which is in turn fixed to the under side of a vehicle through a hanger bracket.

The current method of supporting the bearing cushion within the support bracket includes a plurality of pairs of ears spaced to closely guide and support the bearing cushion. There is some limited clearance between the inner surfaces of the ears and the bearing cushion, which is intended to facilitate the insertion of the bearing cushion into the generally u-shaped support bracket. Once the bearing cushion is within the support bracket it is relatively closely guided by the ears. The bearing cushion can align itself for only a very limited amount relative to the plane of the support bracket. The alignment of a center axis of the bearing cushion within the support bracket is typically less than one degree.

For a number of reasons, the shaft may need to be at various angles within the bearing and thus within its support bracket. As an example, the shaft may extend at an angle at the position supported within the bearing. Manufacturers of heavy vehicles may typically require a large inventory of the hanger bracket types which connect the support bracket to the vehicle, due to these different possible angles.

It would be desirable to reduce the number of required hanger bracket parts by allowing the bearing to be self-aligning within the support bracket.

SUMMARY OF THE INVENTION

In the disclosed embodiment of this invention, a support bracket (u-bracket) supports a bearing cushion by having a plurality of pairs of spaced ears. The ears are spaced by a greater distance than in the prior art such that the bearing support can be self-aligning within the bracket. The central axis of the bearing within the bearing cushion may thus adjust and change relative to a central plane of the support bracket by an angle which is preferably greater than 5 degrees, and most preferably approximately 7 degrees. With such a range, almost all of the currently required distinct orientations of hanger brackets can be provided by a single part. In the prior art, the hanger bracket needed to be modified to accommodate the angles. With this invention, the angles self-adjust within the support bracket.

In another feature of this invention, the bearing cushion is provided with a relief at one extreme location that facilitates bending relative to the plane of the support bracket. In a preferred embodiment the reliefs include a pair of cuts extending into the bearing cushion from outer faces, but separated by a central web. That is, the reliefs do not extend throughout the width of the cushion. The reliefs facilitate the bending of the cushion relative to both the hanger and support brackets, and ensure that the combined bracket and cushion will be able to accommodate any driveline angle orientation that it should see.

These and other features of the present invention will be best understood from the following specification and drawings, the following of which is a brief description.

BRIEF DESCRIPTION OF THE DRAWINGS

FIG. 1 is a schematic cross-sectional view showing a shaft supported within the center bearing support of the present invention.

FIG. 2 is a cross-sectional schematic view of the inventive orientation.

FIG. 3A shows a front view of a bearing cushion.

DETAILED DESCRIPTION OF A PREFERRED EMBODIMENT

Figure 3B:
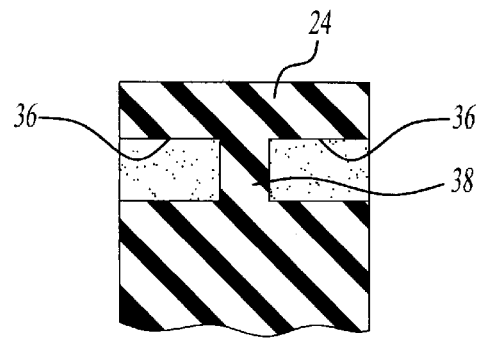
FIG. 3B is a cross-section along line 3B—3B as shown in FIG. 3A.

A center bearing system 20 is illustrated in FIG. 1 having a support bracket 22 shown fixed at 23 to a portion of the vehicle. The connection at 23 is shown schematically. In fact, a hanger bracket provides the function of part 23. As shown, a bearing cushion 24 is received within support bracket 22. The driveline 26 is supported within a bearing 28 which is formed within the bearing cushion 24.

As can be appreciated from FIG. 2, it may sometimes be desirable to allow the central axis of the bearing 28, and the driveline 26 to adjust relative to a central plane C of the support bracket 22. The support bracket 22 is formed with pairs of ears 30 and 32 to support the cushion 24, but allow the cushion to self-align or pivot within the support bracket 22 such that an angle α can adjust the relative position of the driveline axis 26 and the bracket plane C.

Thus, the ears 30 are spaced by a distance $d_1$ while the ears 32 are spaced by a distance $d_2$. As can be appreciated from this figure, the distances $d_1$ and $d_2$ are relatively greater than the thickness $d_3$ of the cushion 24. In this way, the cushion 24, and hence the axis of bearing 28 and the shaft 26 can adjust by an angle which is preferably greater than 5 degrees before the cushion 24 will contact one of the ears. Most preferably the angle is approximately 7 degrees. In a preferred embodiment the distance $d_1$ was 1.92 inches and the distance $d_2$ was 2.14 inches wherein the distance $d_3$ was 1.44 inches. In the prior art, while there was some clearance between the support ears and the outer dimension of the cushion 24, the clearance was minimal. In the prior art the cushion 24 could only adjust by an angle which was approximately 0.5 degree, which did not provide adequate alignment functions. In fact, the clearance in the prior art was intended to facilitate the insertion of the cushion 24 into the bracket 22 and not for any self-aligning function.

As shown in FIG. 3A, the cushion 24 has a plurality of spaced openings 34 extending through cushion 24. Reliefs 36 are formed extending laterally inwardly from the outer surfaces adjacent the top of the cushion 24. As shown in FIG. 3B, the reliefs 36 preferably extend in from both faces and are separated by a central web 38. The reliefs facilitate the bending of the cushion 24 should additional adjustment be desired or required after the cushion 24 first contacts one of the ears 30.

Figure 3C:
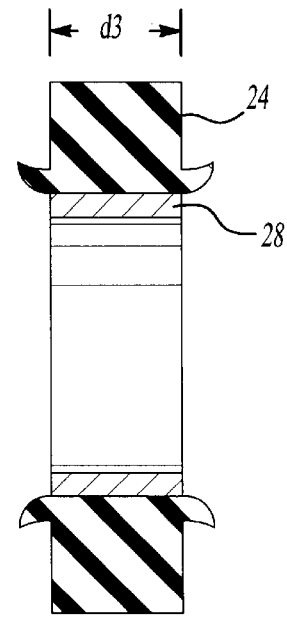
FIG. 3C is a cross-section through the bearing cushion.

As shown in FIG. 3C, the distance $d_3$ through the bushing is not the thickness throughout the entire cushion 24. Rather, the cushion 24 can have a relatively great thickness adjacent the bearing 28, which is not the portion received within the bracket 22.

Figure 4:
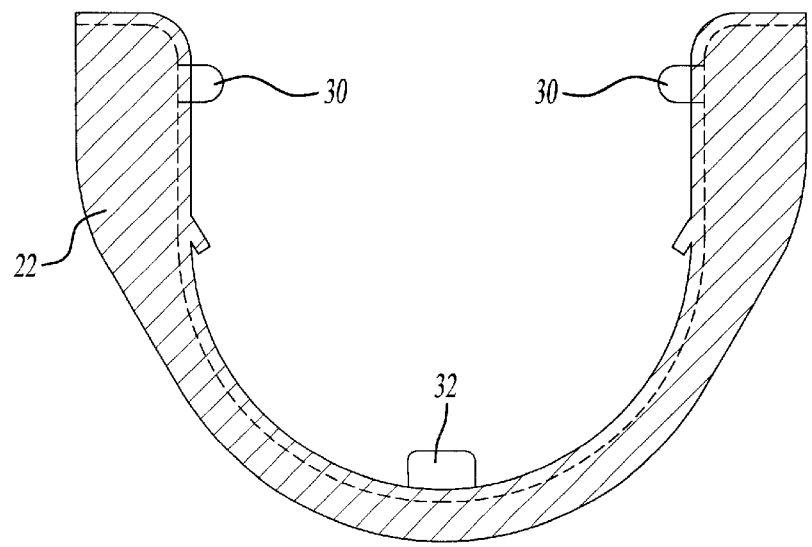
FIG. 4 is a front view of the support bracket.

FIG. 4 shows the support bracket 22 having ears 30 at each lateral side. It should be appreciated that there is a second ear 30 and 32 spaced into the plane of the paper at each of the locations of the ears 30 and 32 as shown in FIG. 4.

Figure 5:
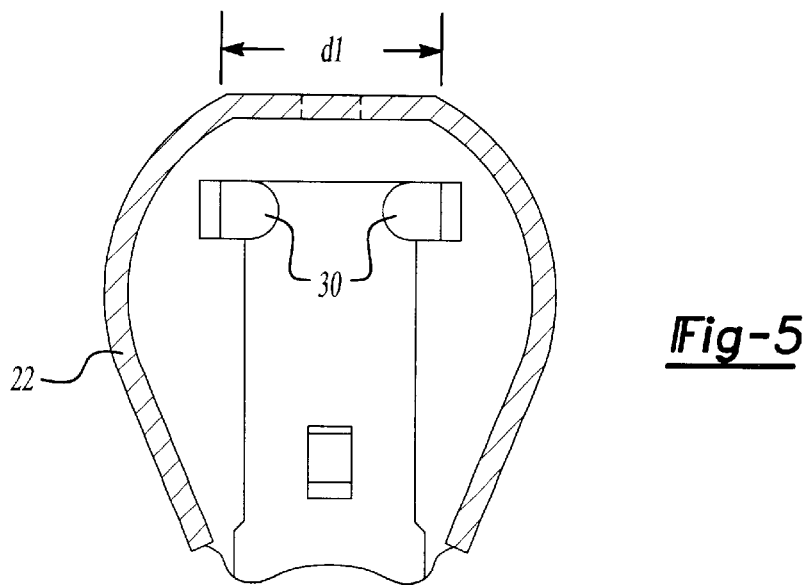
FIG. 5 is an end view looking inwardly at a portion of the support bracket.

FIG. 5 shows a pair of ears 30 adjacent the upper end of the support bracket 22. These ears 30 support the cushion 24 somewhere adjacent the reliefs 36.

Figure 6:
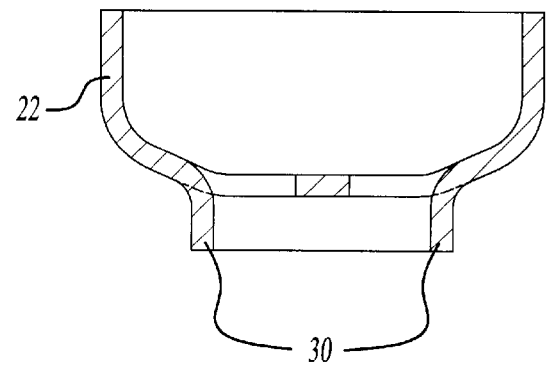
FIG. 6 is a cross-section through a portion of the support bracket.

As shown in FIG. 6, the ears 30 are punched outwardly of the bracket 22.

Figure 7:
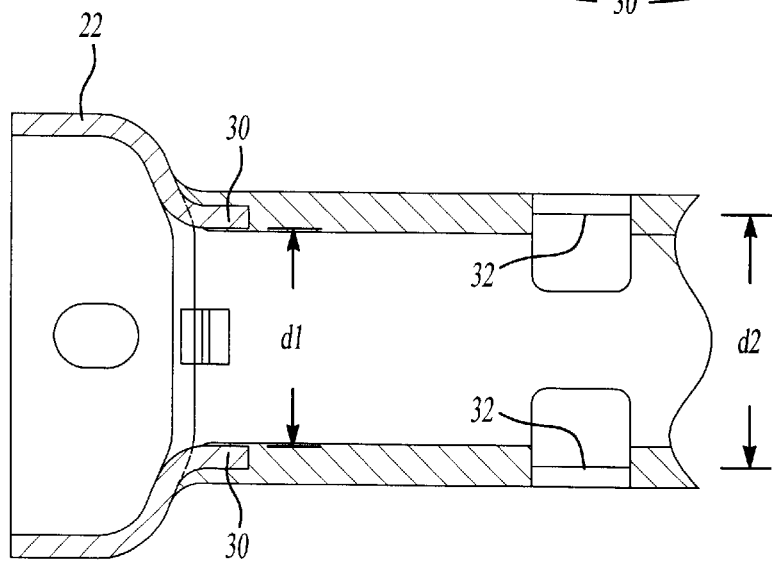
FIG. 7 is a top view looking downwardly into the support bracket.

As shown in FIG. 7, the ears 30 are preferably spaced by a distance $d_1$ that is slightly less than the distance $d_2$ for the ears 32.

A preferred embodiment of this invention has been disclosed. The present invention preferably allows a bearing cushion to be self-aligning within a bearing support bracket. Adjustment angles greater than 5 degrees are achieved. Thus, the present invention greatly reduces the number of required associated hanger brackets, and provides a self-aligning central bearing support.

While a preferred embodiment of this invention has been disclosed, a worker in this art would recognize that many modifications would come within the scope of this invention. For that reason, the following claims should be studied to determine the true scope and content of this invention.

What is claimed is:

1. A central support for a vehicle driveline comprising:

a support bracket being generally u-shaped and receiving a resilient bearing cushion within an open end, and a bearing centered on a central axis in said bearing cushion;

said bracket having a plurality of pairs of spaced ears for limiting axial movement of said bearing cushion, and said spaced ears being spaced by an axial distance relative to a thickness of a portion of said cushion received between said ears such that said cushion can self-align within said bracket to the extent that said central axis can adjust by an angle greater than 5 degrees relative to a central plane of said bracket.

2. A support as set forth in claim 1, wherein there are a pair of upper pairs of ears each spaced by a first distance which is greater than said thickness of said portion of said cushion received between said pair of upper ears, and a pair of lower ears, with a portion of said cushion received between said lower ears also being provided with a clearance between an inner surface of said lower ears.

3. A support as set forth in claim 2, wherein a second distance between inner surfaces of said lower ears is greater than said first distance between said inner surfaces of said upper ears.

4. A support as set forth in claim 1, wherein said bearing cushion further has flexing recesses formed near an upper end that facilitate the bending movement of said cushion within said bracket.

5. A support as set forth in claim 4, wherein there are pairs of said recesses extending inwardly from outer faces of said cushion, and separated by a central web, said pairs of recesses extending inwardly from each lateral side of said cushion.

6. A bearing support for a vehicle driveline comprising:

a vehicle driveline portion extending along an axis;

a bearing support bracket to be fixed to a vehicle at an upper surface, said bearing support bracket having a pair of spaced ears at each of two lateral sides, said pair of spaced ears each being separated by a first distance, and said bearing support bracket having a pair of lower ears spaced by a second distance;

a bearing cushion supporting a central bearing, said central bearing being centered on an axis, said axis being parallel to a central axis of said driveline, said bearing cushion having portions received between each of said pairs of ears in said bearing support bracket, said portions of said cushion being smaller than said first distance or said second distance; and clearances between said portions of said cushions and said inner surfaces of said ears being sufficiently great such that said axis of said bearing can self-adjust within said bracket by an angle greater than 5 degrees relative to a central plane of said bracket.

7. A support as set forth in claim 6, wherein said bearing cushion further has flexing recesses formed near an upper end that facilitate the bending movement of said cushion within said bracket.

8. A support as set forth in claim 7, wherein there are pairs of said recesses extending inwardly from outer faces of said cushion, and separated by a central web, said pairs of recesses extending inwardly from each lateral side of said cushion.

9. A bearing support for a driveline on a vehicle comprising:

a bearing support bracket having a generally u-shape for receiving a bearing cushion, there being three pairs of spaced ears with two of said pairs being spaced near lateral sides of an open end of said unshaped bracket, and a third pair being positioned near a bottom portion of unshaped bracket; and a bearing cushion received within said bearing support bracket, said bearing cushion having recesses cut into each of two opposed faces of said cushion, and laterally inwardly from laterally outer edges, said recesses being separated by a central web.

10. A system as set forth in claim 9, wherein said recesses do not extend laterally inwardly across a central plane of said bearing cushion, but instead only extend inwardly for a limited amount laterally.

* * * * *

UNITED STATES PATENT AND TRADEMARK OFFICE
CERTIFICATE OF CORRECTION

PATENT NO. : 6,379,048 B1  Page 1 of 1
DATED : April 30, 2002
INVENTOR(S) : Brissette It is certified that error appears in the above-identified patent and that said Letters Patent is hereby corrected as shown below:

Column 4,
Lines 43 and 45, "unshaped" should be -- u-shaped --

Signed and Sealed this

Ninth Day of July, 2002

Attest:

JAMES E. ROGAN
Attesting Officer      Director of the United States Patent and Trademark Office